US012481234B2

(12) United States Patent
Saeki

(10) Patent No.: US 12,481,234 B2
(45) Date of Patent: Nov. 25, 2025

(54) FIXING DEVICE WITH CONTACT PORTIONS ON GUIDE MEMBER FOR HEAT MANAGEMENT

(71) Applicant: Toshiba Tec Kabushiki Kaisha, Tokyo (JP)

(72) Inventor: Ryota Saeki, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/677,130

(22) Filed: May 29, 2024

(65) Prior Publication Data

US 2024/0319638 A1 Sep. 26, 2024

Related U.S. Application Data

(63) Continuation of application No. 17/848,045, filed on Jun. 23, 2022, now Pat. No. 12,025,929.

(30) Foreign Application Priority Data

Nov. 1, 2021 (JP) ................................ 2021-178661

(51) Int. Cl.
*G03G 15/20* (2006.01)

(52) U.S. Cl.
CPC . *G03G 15/2028* (2013.01); *G03G 2215/2035* (2013.01)

(58) Field of Classification Search
USPC ........................................................ 399/122
See application file for complete search history.

(56) References Cited

U.S. PATENT DOCUMENTS

| | | | | |
|---|---|---|---|---|
| 10,678,171 | B2 | 6/2020 | Furuichi | |
| 2014/0153982 | A1* | 6/2014 | Adachi | G03G 15/2028 399/329 |
| 2016/0033908 | A1 | 2/2016 | Tsunashima | |
| 2016/0363891 | A1 | 12/2016 | Lee | |
| 2019/0286026 | A1 | 9/2019 | Furuichi | |

(Continued)

FOREIGN PATENT DOCUMENTS

| | | | |
|---|---|---|---|
| EP | 3550374 | A1 | 10/2019 |
| EP | 3816731 | A1 | 5/2021 |
| JP | 2011215648 | A | 10/2011 |

OTHER PUBLICATIONS

Extended European Search Report dated Mar. 15, 2023, mailed in counterpart European Application No. 22196313.5, 8 pages.

*Primary Examiner* — Quana Grainger
(74) *Attorney, Agent, or Firm* — Kim & Stewart LLP

(57) ABSTRACT

According to one embodiment, a fixing device includes a tubular body, a heater unit, a frame, and a guide member. The heater unit is inside the tubular body and contacts the tubular body. The frame supports the heater unit. The guide member is on a side opposite the heater unit with the frame therebetween. The guide member includes a plurality of contact portions which are spaced from each other in a longitudinal direction that parallels an axial direction of the tubular body. A first contact portion is located in an end portion of the guide member. The second contact portion is located in a central portion of the guide member. The second contact portion has an effective heat transfer coefficient with respect to the tubular body that is less than that of the first contact portion with respect to the tubular body.

20 Claims, 10 Drawing Sheets

(56) References Cited

U.S. PATENT DOCUMENTS

| | | | |
|---|---|---|---|
| 2019/0286027 | A1 | 9/2019 | Someya |
| 2022/0075302 | A1 | 3/2022 | Iwaya |
| 2022/0121143 | A1 | 4/2022 | Miyashita |
| 2023/0134207 | A1 | 5/2023 | Saeki |

* cited by examiner

FIXING DEVICE WITH CONTACT PORTIONS ON GUIDE MEMBER FOR HEAT MANAGEMENT

CROSS-REFERENCE TO RELATED APPLICATIONS

This application is a continuation of U.S. patent application Ser. No. 17/848,045, filed Jun. 23, 2022, which is based upon and claims the benefit of priority from Japanese Patent Application No. 2021-178661, filed Nov. 1, 2021, the entire contents of each of which are incorporated herein by reference.

FIELD

Embodiments described herein relate generally to a fixing device for printer devices and the like.

BACKGROUND

An image forming device for forming an image on a sheet is known. Certain types of such image forming devices include a fixing device. The fixing device heats and presses a toner image on a sheet to fix the toner image to the sheet. However, a fixing device capable of reducing unevenness in the fixed image is required for improving printed image quality.

DETAILED DESCRIPTION

In general, according to one embodiment, a fixing device capable of reducing unevenness of an image is provided.

According to an embodiment, a fixing device includes a tubular body, a heater unit contacting an inner surface of the tubular body, a frame configured to support the heater unit inside the tubular body, and a guide member contacting the frame on a side opposite the heater unit. The guide member has a plurality of contact portions which are spaced from each other in a longitudinal direction of the guide member that parallels an axial direction of the tubular body. The contact portions are configured to contact the inner surface of the tubular body. A first contact portion of the plurality of contact portions is located in an end portion of the guide member in the longitudinal direction. A second contact portion of the plurality of contact portions is located in a central portion of the guide member in the longitudinal direction. The second contact portion has an effective heat transfer coefficient with respect to the tubular body that is less than an effective heat transfer coefficient of the first contact portion with respect to the tubular body. In this context, an effective heat transfer coefficient relates to the ability of the portion to receive heat from the tubular body, such that transfer rates, for example, differ for different effective heat transfer coefficients.

Hereinafter, a fixing device according to certain example embodiments will be described with reference to the drawings.

Figure 1:
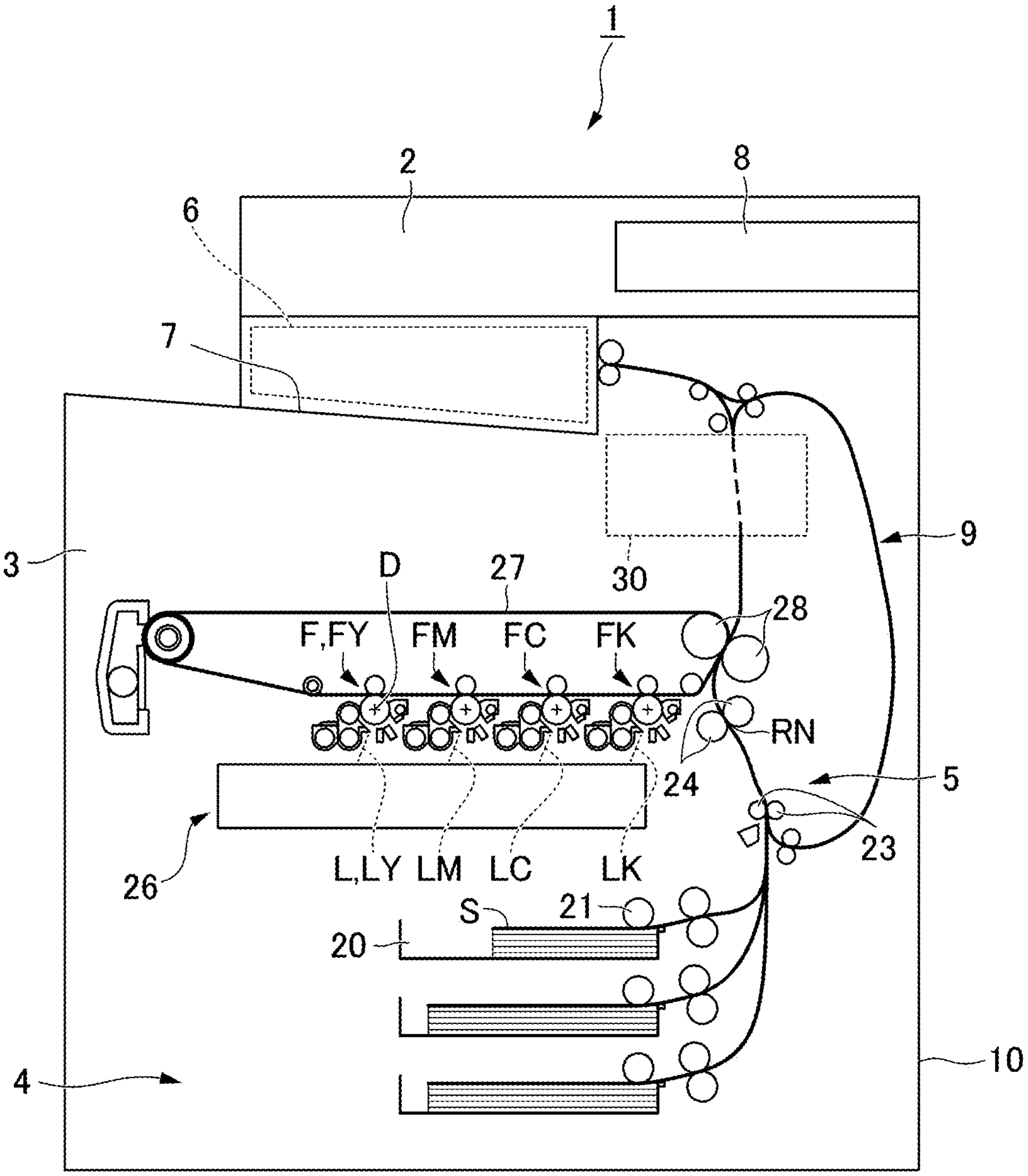
FIG. 1 depicts an image processing device.

FIG. 1 provides a schematic configuration diagram of an image forming device 1.

An image forming device 1 performs a process of forming an image on a sheet S. The sheet S may be paper. The image forming device 1 includes a housing 10, a scanner 2, an image forming unit 3, a sheet supply unit 4, a conveyance unit 5, an inversion unit 9, a tray 7, a control panel 8, and a control unit 6.

The housing 10 forms the outer shape of the image forming device 1.

The scanner 2 reads image information of an object to be copied based on brightness and darkness of light, and generates an image signal. The scanner 2 outputs the generated image signal to the image forming unit 3.

The image forming unit 3 forms a toner image based on the image signal from the scanner 2 or an outside source (external source). The toner image is an image made of toner or other similar material. The image forming unit 3 transfers the toner image onto a surface of the sheet S. The image forming unit 3 heats and presses the toner image on the surface of the sheet S to fix the toner image to the sheet S.

The sheet supply unit 4 supplies the sheets S one by one to the conveyance unit 5 for the image forming unit 3 to form toner images on each. The sheet supply unit 4 includes a sheet housing portion 20 and a pickup roller 21.

The sheet housing portion 20 houses the sheet S on which printing has not yet been performed. In general, the sheet housing portion 20 stores individual sheets S of a known size and type.

The pickup roller 21 takes out the sheets S one by one from the sheet housing portion 20. The pickup roller 21 supplies the taken-out sheet S to the conveyance unit 5.

The conveyance unit 5 conveys the sheet S from the sheet supply unit 4 to the image forming unit 3. The conveyance unit 5 includes conveyance rollers 23 and registration rollers 24.

The conveyance rollers 23 convey the sheet S from the pickup roller 21 to the registration rollers 24. The conveyance rollers 23 work to abut a tip (leading edge) of the sheet S in a conveyance direction against nip RN formed by the registration rollers 24.

The registration rollers 24 adjust a position of the tip of the sheet S along the conveyance direction by pressing the sheet S against the nip RN. The registration rollers 24 convey the sheet S onward at a timing corresponding to that necessary for the image forming unit 3 to appropriately transfer the toner image to the sheet S at the correct position.

The image forming unit 3 includes a plurality of image forming portions F, a laser scanning unit 26, an intermediate transfer belt 27, a transfer portion 28, and a fixing device 30.

The image forming portions F include a photoreceptor drum D. The image forming portions F form, on the photoreceptor drum D, the toner image corresponding to the image signal. The plurality of image forming portions FY, FM, FC, and FK form toner images with yellow, magenta, cyan, and black toners, respectively.

A charger electrostatically charges a surface of the photoreceptor drum D. A developing device houses developers containing the yellow, magenta, cyan, and black toners. The developing device provides developer/toner to develop an electrostatic image that has been formed on the photoreceptor drum D in correspondence with the image signal to be printed. In this example, each image forming portion F forms a separate color toner image on a respective photoreceptor drum D and these separate color toner images are transferred one after the other to the intermediate transfer belt 27.

The laser scanning unit 26 scans each charged photoreceptor drum D with a laser beam L to selectively expose the photoreceptor drum D in correspondence with the image signal to be printed. In order to form the electrostatic latent images on the photoconductor drums D of the image forming portions FY, FM, FC, and FK of the respective colors, the photoreceptor drums D are exposed with different laser beams LY, LM, LC, and LK by the laser scanning unit 26, respectively.

The intermediate transfer belt 27 receives the toner image from the surface of the photoreceptor drums D. The transfer from photoreceptor drum D to the intermediate transfer belt 27 is sometimes referred to as a primary transfer.

Then, at the transfer portion 28, the toner image (s) are transferred onto the surface of the sheet S from the intermediate transfer belt 27 at what is called a secondary transfer position. The transfer from the intermediate transfer belt to the sheet S is sometimes referred to as a secondary transfer.

The fixing device 30 heats and presses the toner image on the sheet S to fix the toner image to the sheet S.

The inversion unit 9 (reversing unit) can invert the sheet S so an image can be formed on a back surface of the sheet S (e.g., double-sided printing). The inversion unit 9 reverses a sheet S that has been discharged from the fixing device 30 by use of a switchback. The inversion unit 9 conveys the inverted sheet S back toward the registration rollers 24.

The tray 7 can receive a discharged sheet S on which an image has been formed.

The control panel 8 is a part of an input unit by which information can be input by an operator to operate the image forming device 1. The control panel 8 includes a touch panel and various hard keys, buttons, switches, or the like.

The control unit 6 controls an operation of each sub-unit of the image forming device 1.

Figure 2:
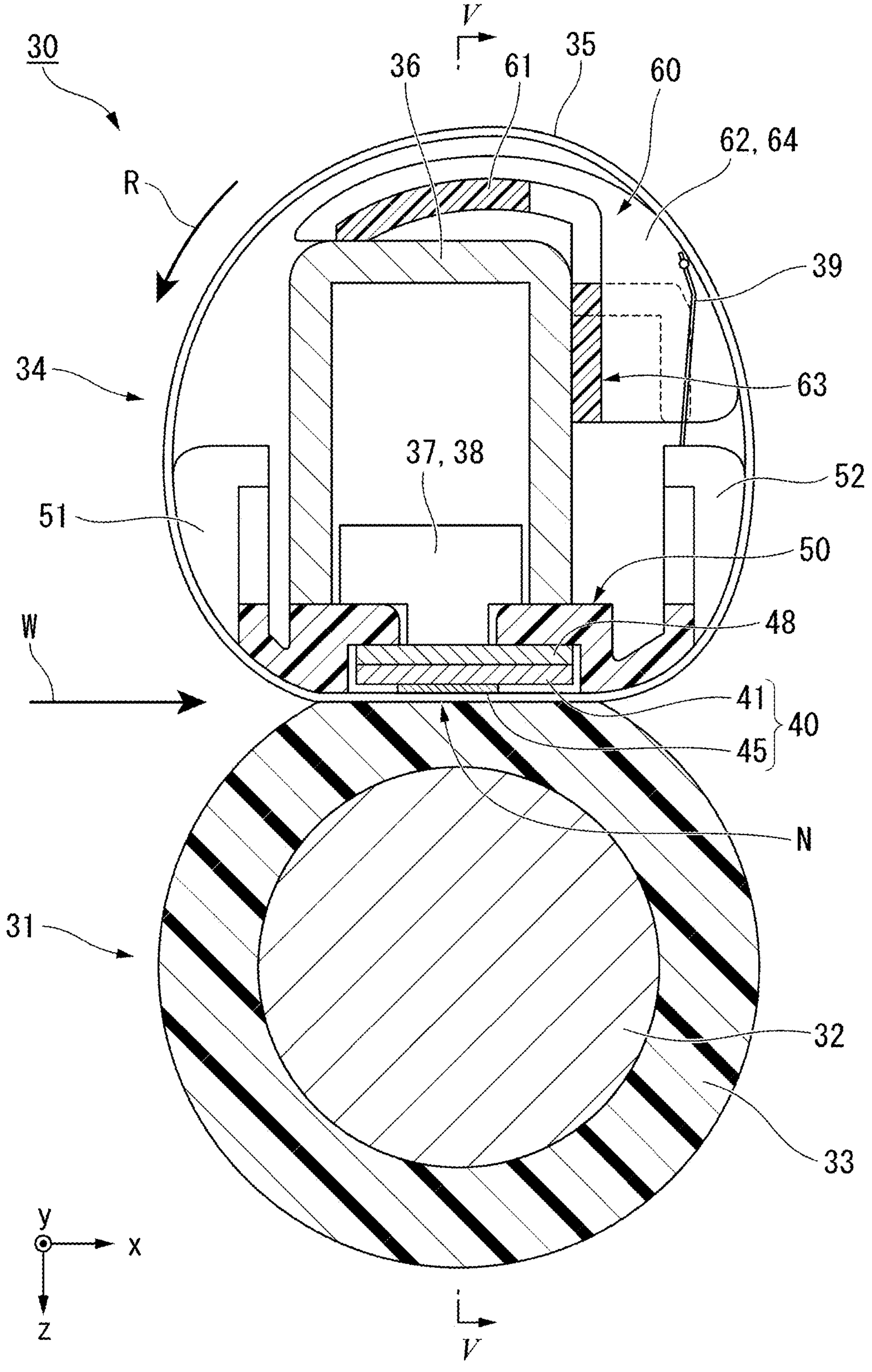
FIG. 2 is a cross-sectional view of a fixing device.

FIG. 2 is a cross-sectional view of the fixing device 30. The fixing device 30 includes a pressure roller 31 and a heating roller 34. A nip N is formed between the pressure roller 31 and the heating roller 34.

In the present application, a z direction, an x direction, and a y direction are defined as follows for purposes of descriptive convenience. The z direction is a thickness direction of a substrate 41. The z direction is also the direction in which the heating roller 34 and the pressure roller 31 are arranged adjacent to each other. The +z direction is a direction from the heating roller 34 toward the pressure roller 31. The x direction is a lateral direction of the substrate 41 and also the conveyance direction of the sheet S through the nip N. The +x direction is the downstream side of the sheet S along the conveyance direction. The y direction is a longitudinal direction of the substrate 41 and also the axial direction of tubular film 35 of the heating roller 34.

The pressure roller 31 presses the toner image on the sheet S in the nip N. The pressure roller 31 includes a metal core 32 and an elastic layer 33. The configuration of the pressure roller 31 is not limited to the above, and various configurations are possible.

The metal core 32 is formed in a columnar shape by a metal material such as stainless steel. The elastic layer 33 is made of an elastic material such as silicone rubber. The elastic layer 33 is formed on an outer surface of the metal core 32 with a constant thickness. A release layer made of a resin material such as a tetrafluoroethylene-perfluoroalkyl vinyl ether copolymer (PFA) may be formed on an outer surface of the elastic layer 33.

The pressure roller 31 is driven by a motor to rotate. When the pressure roller 31 rotates in a state where the nip N is formed (that is, the pressure roller 31 can contact the heating roller 34), the tubular film 35 of the heating roller 34 is driven to rotate. The pressure roller 31 rotates to convey the sheet S in a conveyance direction W through (past) the nip N.

The heating roller 34 heats the toner image on the sheet S in the nip N. The heating roller 34 includes the tubular film 35, a heater unit 40, a heat transfer member 48, a support member 50, a frame 36, and temperature sensitive elements (37, 38, 39). A configuration of the heating roller 34 is not limited to the above, and various configurations are possible.

The tubular film 35 has a tubular shape and may be more generally referred to as a tubular body, a cylinder, or a cylindrical body. The tubular film 35 includes a base layer, an elastic layer, and the release layer stacked in this order from an inner peripheral side. The base layer can be made of a resin material such as PI (polyimide) with a low heat capacity. The elastic layer is made of an elastic material such as silicone rubber. The release layer is made of a material such as PFA resin.

The heater unit 40 is inside the tubular film 35. A surface of the heater unit 40 facing in the +z direction is in contact with an inner surface of the tubular film 35 via a grease or the like.

Figure 3:
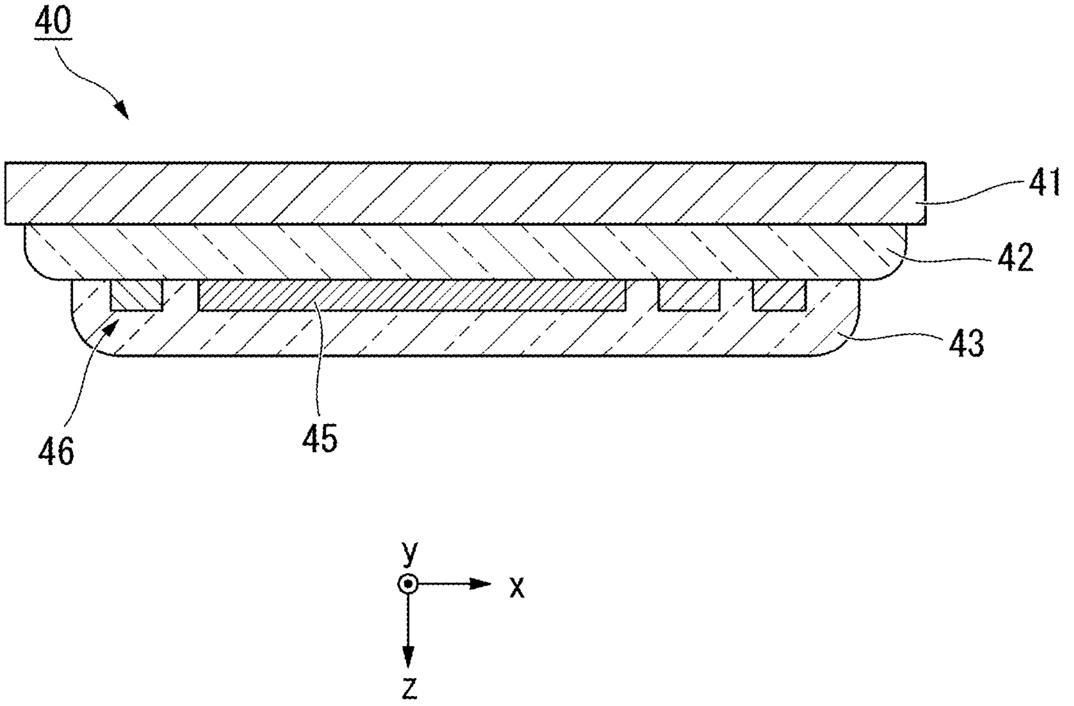
FIG. 3 is a cross-sectional view of a heater unit.
Figure 4:
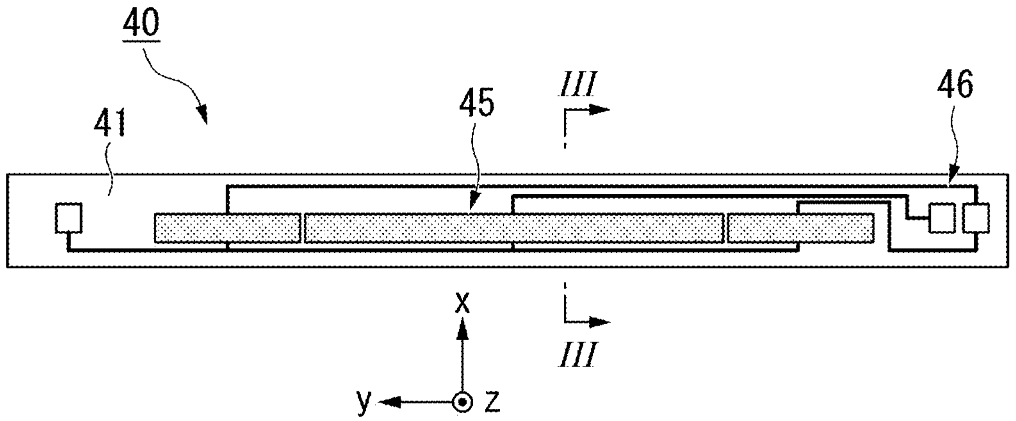
FIG. 4 is a bottom view of a heater unit.

FIG. 3 is a cross-sectional view of the heater unit 40 taken along a line III-III in FIG. 4. FIG. 4 is a bottom view (viewed from the +z direction) of the heater unit 40. The heater unit 40 includes the substrate 41, a heating element 45, and a wiring 46.

The substrate 41 is made of a metal material such as stainless steel or a ceramic material such as aluminum nitride. As illustrated in FIG. 4, the substrate 41 has a rectangular plate shape. The axial direction of the tubular film 35 corresponds to the longitudinal direction of the substrate 41. As illustrated in FIG. 3, an insulating layer 42 is on a surface of the substrate 41 facing in the +z direction. The insulating layer 42 may be a glass or glass-like material in some examples. Another insulating layer, similar to the insulating layer 42, may be formed on the −z direction side of the substrate 41 in some examples.

The heating element 45 is made of a silver-palladium alloy or the like. The heating element 45 generates heat when energized (e.g., supplied with electric current). The heating element 45 and the wiring 46 are disposed on the +z direction surface of the substrate 41 via the insulating layer 42. A protective layer 43 made of a glass material or the like covers the heating element 45 and the wiring 46. A protective layer similar to the protective layer 43 may be formed in the −z direction side of the substrate 41 in some examples.

As illustrated in FIG. 4, the heating element 45 includes a central heating element and a pair of end heating elements. The central heating element is disposed at a middle portion along the y direction. The pair of end heating elements are located at both ends of the central heating element in the y direction. The central heating element and the pair of end heating elements can be separately controlled to generate heat independently of each other. In this example, the pair of end heating elements are controlled together for heat generation, though in other examples the pair may be independent of one another.

The heat transfer member 48 (illustrated in FIG. 2) is made of a metal material having high thermal conductivity such as copper. An outer shape of the heat transfer member 48 is generally the same as that of the substrate 41 of the heater unit 40. The heat transfer member 48 is arranged in the −z direction from the substrate 41 and is in contact with the substrate 41.

The support member 50 is made of a resin material such as a liquid crystal polymer. The support member 50 covers both edges of the heater unit 40 in the x direction and also covers a portion of the heater unit 40 from the −z direction. The support member 50 supports the heater unit 40 via the heat transfer member 48 from the −z direction. The support member 50 also provides support (e.g., contacts) to an inner surface of the tubular film 35 on both sides of the heater unit 40 in the x direction.

The support member 50 includes an upstream rib 51 and a downstream rib 52. These rib components may be referred to as a pair of ribs in some instances. The upstream rib 51 extends upstream along a rotational direction of the tubular film 35. The downstream rib 52 extends downstream along the rotational direction of the tubular film 35. The ribs 51 and 52 can abut on an inner surface of the tubular film 35. The ribs 51 and 52 hold the tubular film 35 in a defined shape. The ribs 51 and 52 have a plate shape with the y direction as a plate thickness direction. In this example, there is a plurality of upstream ribs 51 and a plurality of downstream ribs 52 arranged in the y direction. The upstream ribs 51 may be located at different positions along the y direction from the downstream ribs 52. That is, the upstream ribs 51 may be offset in the y direction from the downstream ribs 52. Accordingly, by such an arrangement, temperature unevenness of the fixing device 30 can be reduced.

The frame 36 is made of a steel plate material or the like. The frame 36 is inside the tubular film 35. A cross section of the frame 36 perpendicular to the y direction is a U shape. The frame 36 is mounted on a −z direction side of the support member 50 such that the U-shaped opening of the frame is closed with the support member 50. The frame 36 extends in the y direction. Both ends of the frame 36 in the y direction can be fixed to the housing 10 of the image forming device 1. The frame 36 physically supports the heater unit 40 via the support member 50 and the heat transfer member 48.

The temperature sensitive elements (37, 38, 39) are a heater thermometer 37, a thermostat 38, and a film thermometer 39. The heater thermometer 37 and the thermostat 38 are located on the −z direction side of the heater unit 40 with the heat transfer member 48 interposed therebetween. The heater thermometer 37 measures a temperature of the heater unit 40 via the heat transfer member 48. The thermostat 38 cuts off power to the heating element 45 when the temperature of the heater unit 40 (as detected via the heat transfer member 48) exceeds a predetermined temperature (threshold temperature). The film thermometer 39 is in contact with the inner surface of the tubular film 35 and measures a temperature of the tubular film 35. The film thermometer 39 measures the temperature of the tubular film 35 at positions corresponding to the central heating element and the end heating elements of the heater unit 40.

A guide member 60 is made of a resin material such as a liquid crystal polymer. The guide member 60 is inside the tubular film 35. The guide member 60 is on a side opposite the heater unit 40 with the frame 36 interposed therebetween. The guide member 60 covers about half of a +x direction surface of the frame 36 and an entire surface of the frame 36 in the −z direction. The guide member 60 includes a base portion 61 and ribs 62.

The base portion 61 is in the +x direction and the −z direction of the frame 36. The base portion 61 is fixed to the frame 36. The base portion 61 is long in the y direction.

The ribs 62 contact the tubular film 35. Each rib 62 projects from the base portion 61 in a radial direction of the tubular film 35. The ribs 62 extends around the circumferential direction of the tubular film 35. Since the ribs 62 are in contact with the tubular film 35, the tubular film 35 is supported by the ribs 62. Thus, even when the tubular film 35 is formed of a thin, low-rigidity (flexible) resin material, the rotational trajectory and shape of the tubular film 35 is secured.

Figure 6:
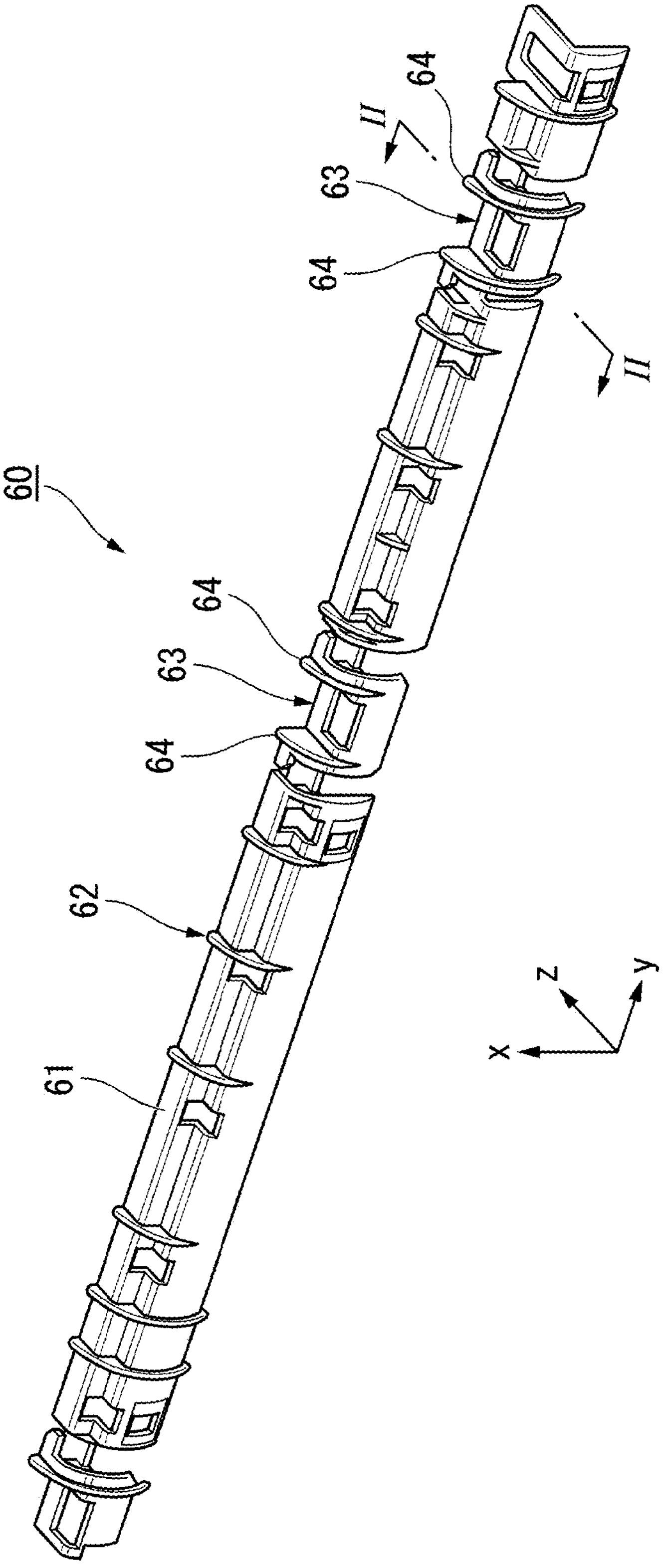
FIG. 6 is a perspective view of a guide member.

FIG. 6 is a perspective view of a guide member 60. A rib 62 has a plate-like shape with the y direction as the plate thickness direction. The plurality of ribs 62 are arranged in the y direction. The plurality of ribs 62 may be located at different positions along the y direction from the upstream ribs 51 and the downstream ribs 52 of the support member 50 (illustrated in FIG. 2). Accordingly, the temperature unevenness of the fixing device 30 is reduced.

As illustrated in FIG. 6, the base portion 61 has recesses 63. A recess 63 is located at a central portion of the base portion 61 and another is located at a +y direction end of the base portion 61. The recesses 63 are recessed in the −x direction of the base portion 61. FIG. 2 corresponds to a cross-sectional view of the fixing device 30 taken along a line II-II in FIG. 6. A film thermometer 39 (see FIG. 2) is disposed inside the recess 63 located at the line II-II. Another film thermometer 39 or the like may be disposed inside the centrally located recess 63. As illustrated in FIG. 6, the plurality of ribs 62 includes pairs of recess ribs 64. The recess ribs 64 are located on both sides of each recess 63 in the y direction. When the recess ribs 64 are in contact with the tubular film 35, the posture of the tubular film 35 is stabilized around a position of the film thermometer 39 disposed in the corresponding recess 63. Accordingly, accuracy of the temperature measurement by the film thermometer 39 is improved.

Figure 5:
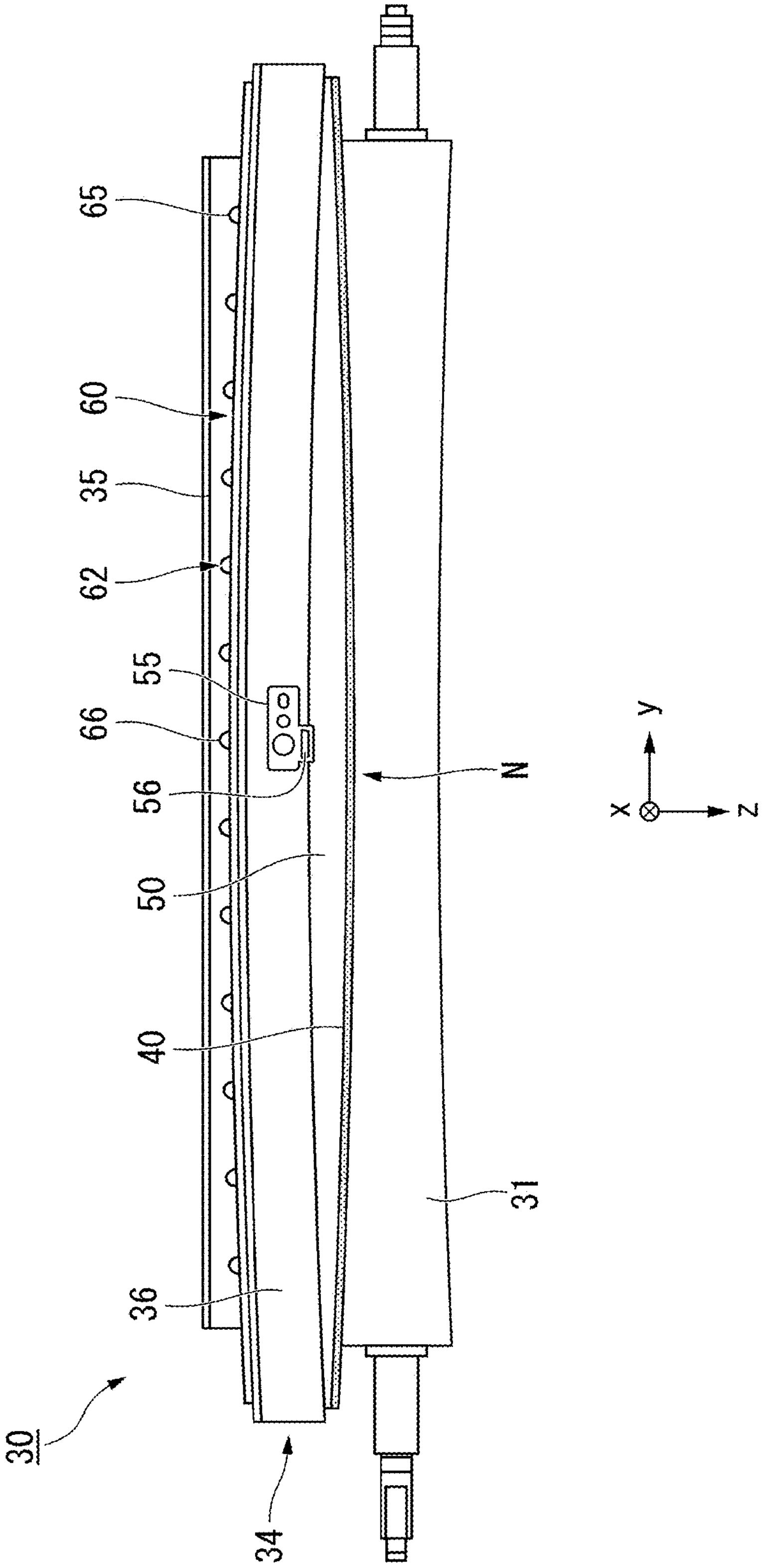
FIG. 5 is another cross-sectional view of a fixing device.

FIG. 5 is a cross-sectional view of the fixing device taken along a line V-V in FIG. 2. As depicted, the pressure roller 31 is narrower in the middle and thicker at the ends. That is, a diameter of the central portion (along the y direction) of the pressure roller 31 is less than the diameter of the y-direction ends. Accordingly, wrinkling of a sheet S passing through the nip N of the fixing device 30 can be reduced.

The support member 50 of the heating roller 34 has a correspondingly outwardly bowed shape. That is, a thickness of the support member 50 at a middle portion of the support member 50 is greater than at the thickness of the support member at both y direction ends. The width in the x direction of the nip N formed between the pressure roller 31 and the heating roller 34 is substantially uniform along the y direction. Accordingly, fixing performance of the fixing device 30 is substantially uniform along the y direction.

The frame 36 is connected to the support member 50 via a positioning member 55. The positioning member 55 is mounted at a central portion of the frame 36 along the y direction. A locking claw 56 of the support member 50 is inserted into a locking hole of the positioning member 55. The frame 36 is curved (or bent) in the −z direction. More particularly, the frame 36 is curved such that the central portion thereof is convex in the −z direction. On the other hand, side of the tubular film 35 on the −z direction side of the frame 36 is substantially parallel along the y direction since this side of the tubular film 35 is not constrained by other members.

The guide member 60 is curved in the same manner as the frame 36. The guide member 60 is curved such that a central portion thereof is convex in the −z direction. It is assumed in the present example that shapes of the ribs 62 are all the same. In this case, a tip of a second rib 66, which is one of the ribs 62 near the middle of the guide member 60 along the y direction, will be closer to the tubular film 35 in the −z direction than will be a tip of a first rib 65, which is one of the ribs at an end in the y direction of the guide member 60. That is, the distance along the z direction between the tip of the first rib 65 and the tubular film 35 is less than the distance along the z direction between the tip of the second rib 66 and the tubular film 35. The second rib 66 is thus more likely to come into contact with the tubular film 35 than the first rib 65. Heat of the tubular film 35 is transferred to the plurality of ribs 62 by physical contact between the tubular film 35 and a rib 62. A temperature at a central portion of the tubular film 35 is thus generally lower than the temperature at the of ends since centrally located ribs 62 are more often in contact with the tubular film 35 than the ribs 62 located at the ends of the tubular film 35. Thus, a temperature unevenness of the fixing device 30 occurs, and/or gloss unevenness occurs in the image formed on a sheet.

First Embodiment

Figure 7:
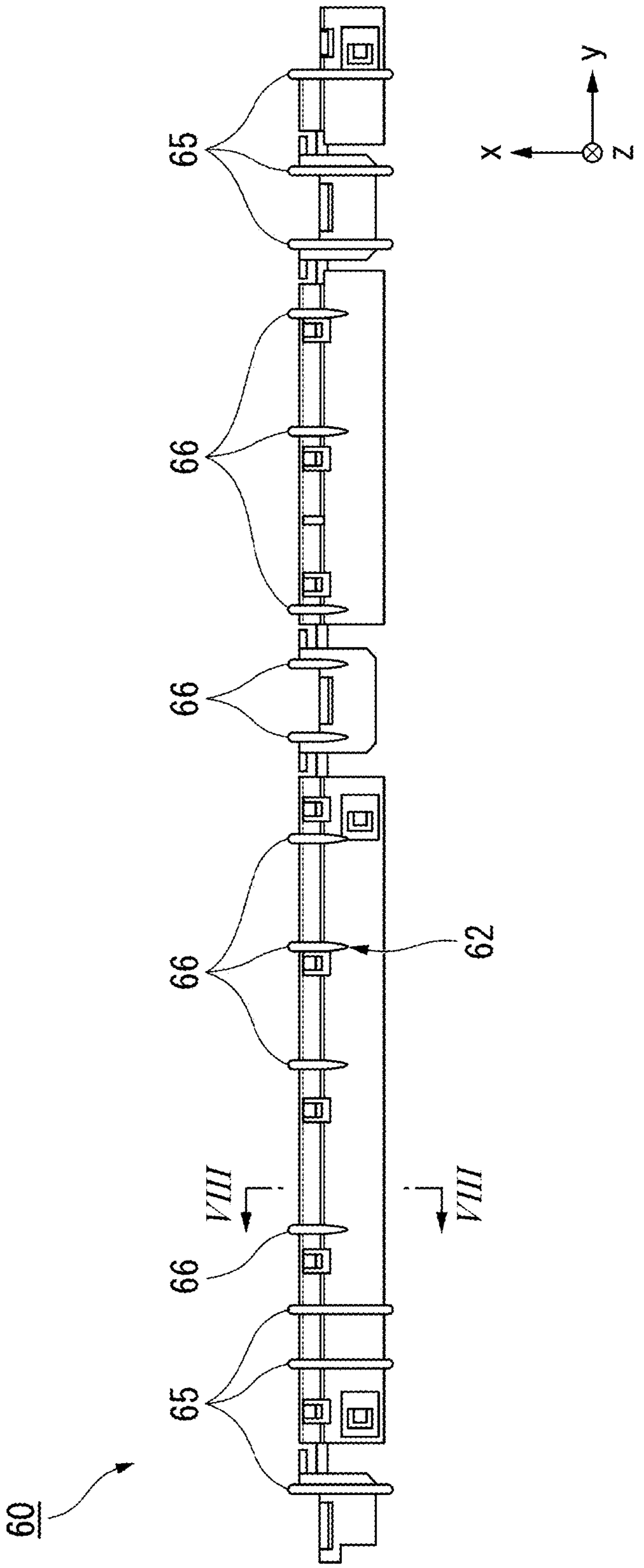
FIG. 7 is a plan view of a guide member according to a first embodiment.

FIG. 7 is a plan view of the guide member 60 according to a first embodiment. The guide member 60 includes the first ribs 65 and the second ribs 66 as members of the plurality of ribs 62. Three first ribs 65 are disposed at each of the ends of the guide member 60 in the y direction. Nine second ribs 66 are disposed in the central portion of the guide member 60. The numbers of the first ribs 65 and the second ribs 66 are not limited thereto.

Widths of each first rib 65 and each second rib 66 in the y direction are the same as one another.

Figure 8:
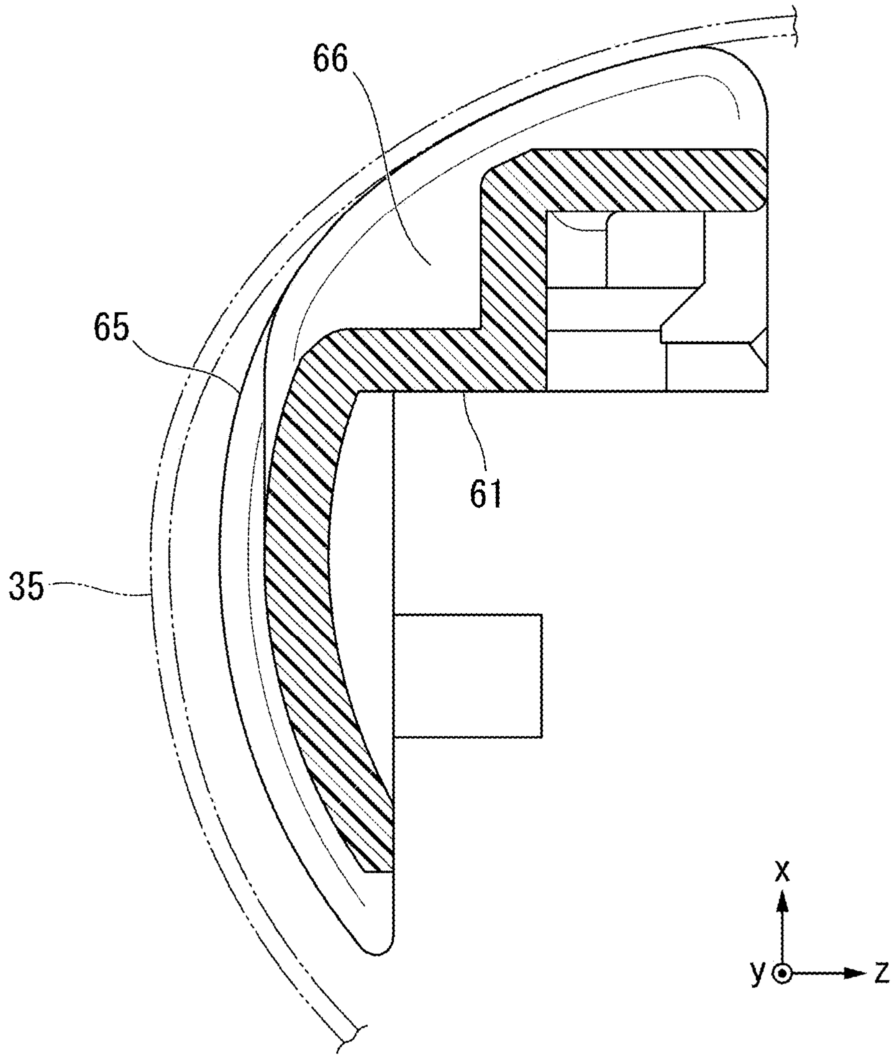
FIG. 8 is a cross-sectional view of a guide member.

FIG. 8 is a cross-sectional view taken along a line VIII-VIII in FIG. 7. Heights of the first ribs 65 and the second ribs 66 in the radial direction of the tubular film 35 are the same. However, lengths of the second ribs 66 in the circumferential direction of the tubular film 35 are shorter than those of the first ribs 65. The lengths of the ribs 65 and 66 in the circumferential direction are the lengths of outer circumferences of the ribs 65 and 66. The lengths of the second ribs 66 are about half the lengths of the first ribs 65. Thus, the contact areas between the second ribs 66 and the tubular film 35 are less than the contact areas between the first ribs 65 and the tubular film 35. An effective heat transfer coefficient between the second ribs 66 and the tubular film 35 is thus smaller than an effective heat transfer coefficient between the first ribs 65 and the tubular film 35.

As detailed above, the fixing device 30 according to the first embodiment includes the tubular film 35, the heater unit 40, the frame 36, the guide member 60, the first ribs 65, and the second ribs 66. The heater unit 40 is inside the tubular film 35 and is in contact with the tubular film 35. The frame 36 is inside the tubular film 35 and supports the heater unit 40. The guide member 60 is inside the tubular film 35 and is on the side opposite the heater unit 40 with the frame 36 interposed therebetween. The guide member 60 includes the plurality of ribs 62 which can contact the tubular film 35. The first ribs 65 are located at ends in the y direction among the plurality of ribs 62. The second ribs 66 are located at the central portion in the y direction among the plurality of ribs 62. The heat transfer between the second ribs 66 and the tubular film 35 is less than the heat transfer between the first ribs 65 and the tubular film 35 due to the differences in rib length (outer circumference).

As described above, the guide member 60 is curved such that the central portion thereof is convex in the −z direction. The heat transfer between the second ribs 66 and the tubular film 35 is less than the heat transfer between the first ribs 65 and the tubular film 35. Heat transfer from the tubular film 35 to the plurality of ribs 62 is thus more uniform along the y direction. The temperature unevenness of the fixing device 30 is reduced, and unevenness of an image is reduced.

The contact areas between the second ribs 66 and the tubular film 35 are smaller than the contact areas between the first ribs 65 and the tubular film 35.

Accordingly, the effective heat transfer coefficient between the second ribs 66 and the tubular film 35 is less than the effective heat transfer coefficient between the first ribs 65 and the tubular film 35.

In the guide member 60 according to a first embodiment, the lengths of the second ribs 66 in the circumferential direction are shorter than the lengths of the first ribs 65 in the circumferential direction.

Accordingly, the contact areas between the second ribs 66 and the tubular film 35 are smaller than the contact areas between the first ribs 65 and the tubular film 35.

Second Embodiment

Figure 9:
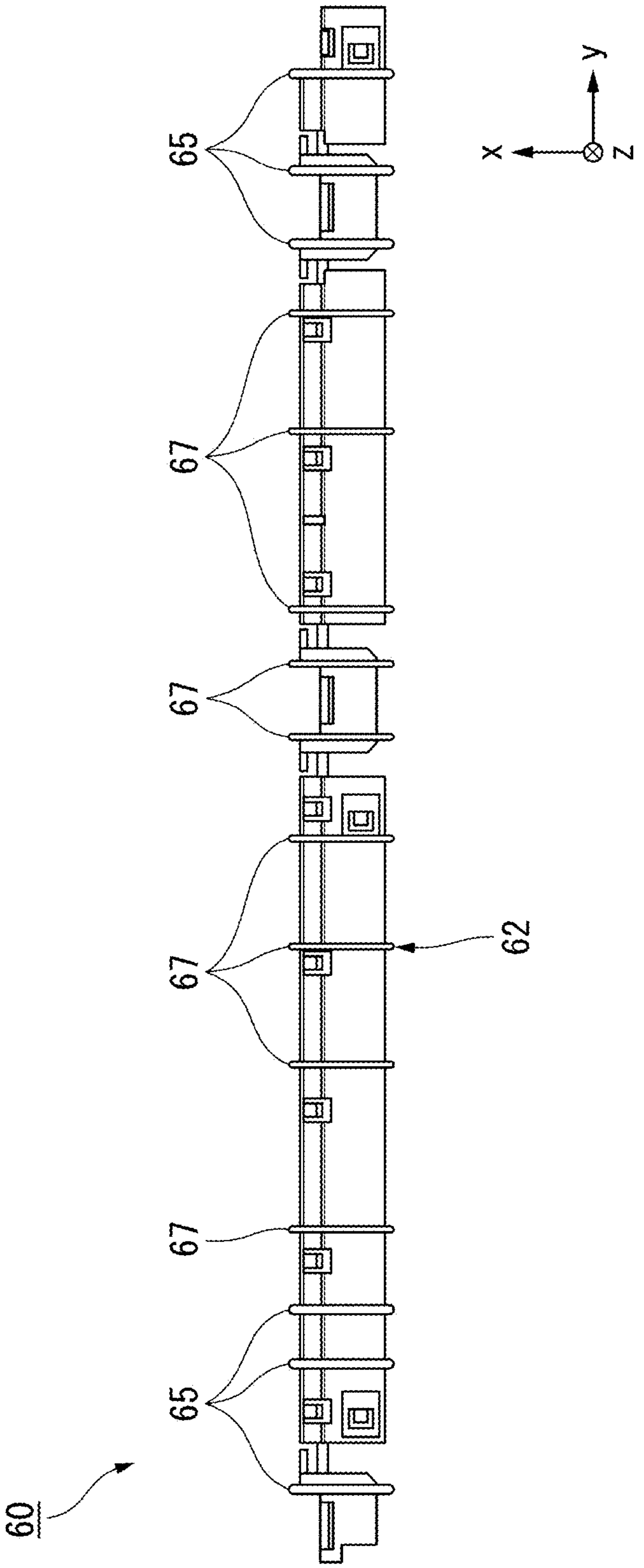
FIG. 9 is a plan view of a guide member according to a second embodiment.

FIG. 9 is a plan view of a guide member 60 according to a second embodiment. The guide member 60 according to the second embodiment is different from the first embodiment in that widths in the y direction of the first ribs 65 and second ribs 67 are different from one another. The description of the second embodiment may omit those aspects shared with the first embodiment.

Heights of the first ribs 65 and the second ribs 67 in the radial direction of the tubular film 35 are the same in the second embodiment. Lengths of the first ribs 65 and the second ribs 67 in the circumferential direction of the tubular film 35 are also the same in this embodiment. However, widths of the second ribs 67 in the y direction are less than those of the first ribs 65. In the present example, the width of each of the second ribs 67 is about half the width of each of the first ribs 65. Contact area between the second ribs 67 and the tubular film 35 is thus less than contact area between the first ribs 65 and the tubular film 35. An effective heat transfer coefficient between the second ribs 67 and the tubular film 35 is less than the effective heat transfer coefficient between the first ribs 65 and the tubular film 35.

In the second embodiment, the widths of the second ribs 67 in the y direction are less than the widths of the first ribs 65 in the y direction. Heat transfer from the tubular film 35 to the plurality of ribs 62 is thus more uniform along the y direction. Temperature unevenness of the fixing device 30 is reduced, and unevenness of an image is reduced.

Third Embodiment

Figure 10:
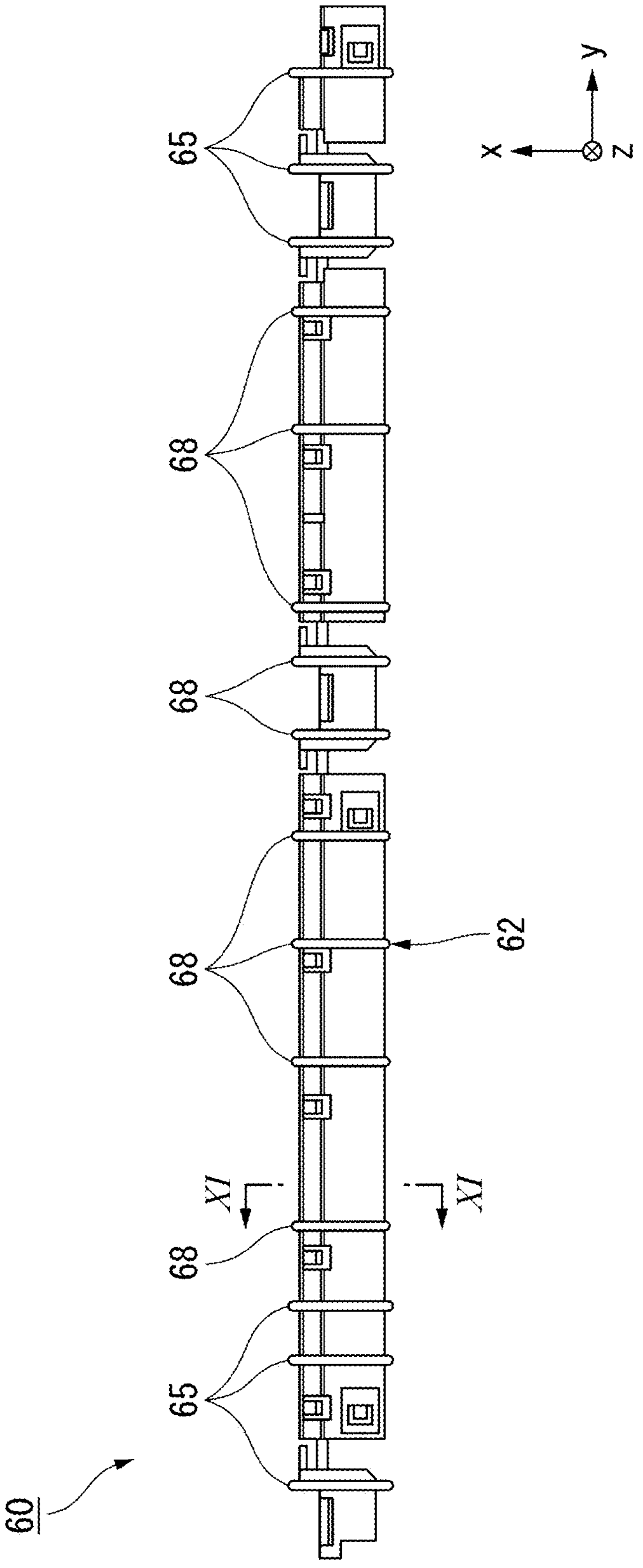
FIG. 10 is a plan view of a guide member according to a third embodiment.

FIG. 10 is a plan view of a guide member 60 according to a third embodiment. The guide member 60 according to the third embodiment is different from that according to the first embodiment in that heights of the first ribs 65 and second ribs 68 in the radial direction of the tubular film 35 are different. The description of the third embodiment may omit those aspects shared with the first embodiment.

Widths of the first ribs 65 and the second ribs 68 in the y direction are the same in the third embodiment.

Figure 11:
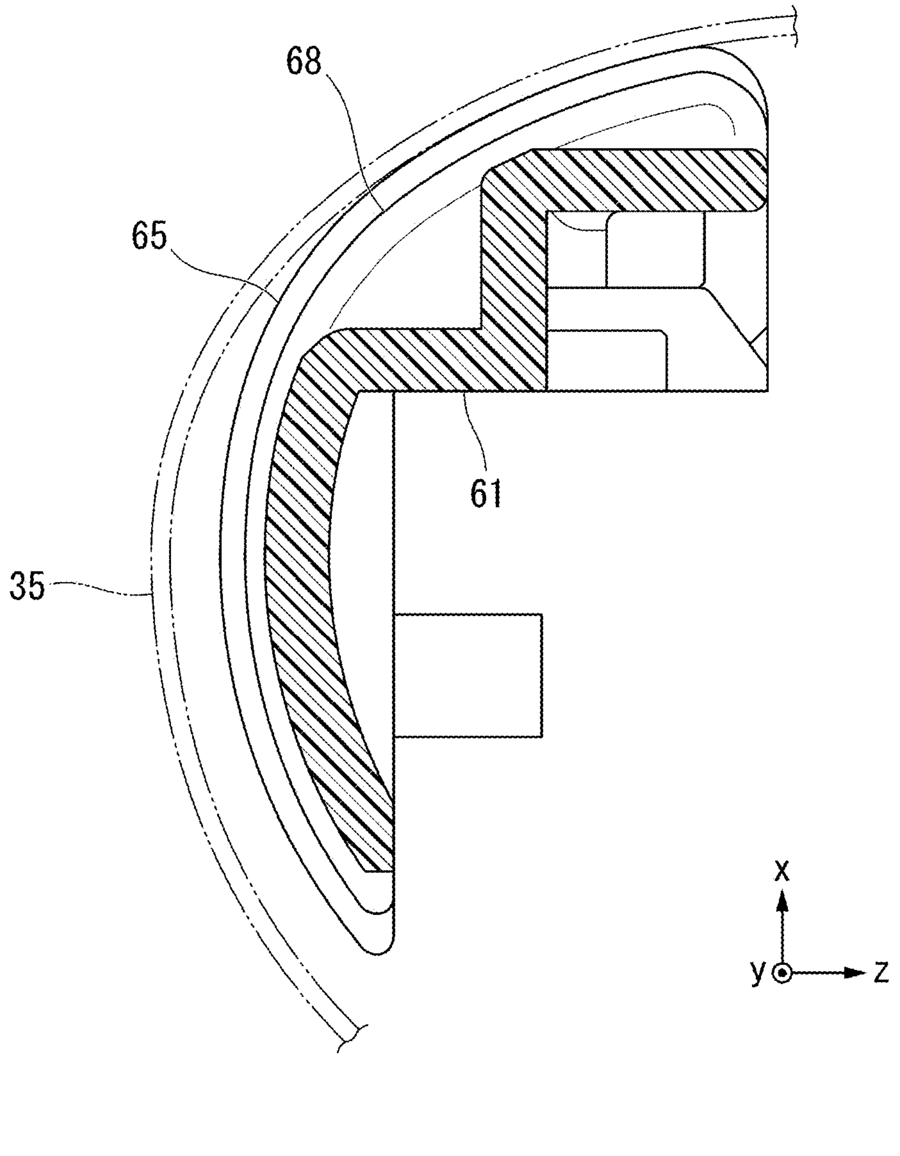
FIG. 11 is a cross-sectional view of a guide member according to a third embodiment.

FIG. 11 is a cross-sectional view taken along a line XI-XI in FIG. 10. Lengths of the first ribs 65 and the second ribs 68 in the circumferential direction of the tubular film 35 are the same in this third embodiment. Heights of the second ribs 68 in the radial direction of the tubular film 35 are less than that of the first ribs 65. The heights of the ribs 65 and 68 in the radial direction of the tubular film 35 are taken in this context as distances from a central axis of the tubular film 35 to outermost surface of the ribs 65 and 68. The heights of the ribs 65 and 68 in this context are those compared at the same phase position along the circumferential direction of the tubular film 35. Contact areas between the second ribs 68 and the tubular film 35 are less than contact areas between the first ribs 65 and the tubular film 35. An effective heat transfer coefficient between the second ribs 68 and the tubular film 35 is less than the heat transfer coefficient between the first ribs 65 and the tubular film 35.

As described above, the heights of the second ribs 68 in the radial direction of the tubular film 35 are less than the heights of the first ribs 65 in the radial direction of the tubular film 35. Heat transfer from the tubular film 35 to the plurality of ribs 62 is thus more uniform along the y direction. Temperature unevenness of the fixing device 30 is reduced, and unevenness of an image is reduced.

Fourth Embodiment

The guide member 60 according a fourth embodiment is different from that according to the first embodiment in that materials of the first ribs 65 and second ribs 69 are different from one another. The description of the fourth embodiment may omit those aspects shared with the first embodiment.

Shapes of the first ribs 65 and the second ribs 69 are the same. Contact area between the second ribs 69 and the tubular film 35 are equal to the contact area between the first ribs 65 and the tubular film 35.

The base portion 61 and the first ribs 65 of the guide member 60 are integrally made of a resin material such as a liquid crystal polymer. The second ribs 69 are formed separately from the base portion 61 in this example. The second ribs 69 are made of a material having lower thermal conductivity than the material from which the first ribs 65 are formed. For example, the second ribs 69 are made of a resin material such as a tetrafluoroethylene-perfluoroalkyl vinyl ether copolymer (PFA). A heat transfer coefficient of the material of second ribs 69 is less than the heat transfer coefficient of the material of the first ribs 65.

For fabricating the fourth embodiment, in one example, mounting pins can be formed on the second ribs 69 and mounting holes can be formed on the base portion 61. The mounting pins of the second ribs 69 can then be inserted into the mounting holes formed in the base portion 61, and the second ribs 69 thus can be fixed to the base portion 61. The method for mounting the second ribs 69 to the base portion 61 is not limited thereto.

As described above, the thermal conductivity of the material of the second ribs 69 is lower than the thermal conductivity of the material of the first ribs 65. Heat transfer from the tubular film 35 to the plurality of ribs 62 is thus more uniform along the y direction. Temperature unevenness of the fixing device 30 is reduced, and unevenness of an image is reduced.

In the fourth embodiment, the entire material of the second ribs 69 is different from that of the first ribs 65. However, in some examples, just the material at the outer surfaces of the second ribs 69 that contact with the tubular film 35 may be formed of a material different from the outer surfaces of the first ribs 65. For example, the outer surfaces of the second ribs 69 may be coated with a material having a low thermal conductivity such as PFA resin. In this case, the entire guide member 60 including the second ribs 69 can be integrally made of the same resin material, such as a liquid crystal polymer with just a different surface coating on certain portions.

The second ribs (66, 67, 68, 69) in the various example embodiments are different from the first ribs 65 in some manner or characteristic according to the first to fourth embodiments. In some examples, a second rib that combines aspects of the differences in two or more of the first to fourth embodiments may be adopted.

The guide member 60 according to certain embodiments includes as a plurality of ribs 62, the described first ribs 65 and at least one of the types of second ribs (66, 67, 68, 69). Thus, the plurality of ribs 62 includes ribs with at least two different effective heat transfer coefficients (or heat transfer rates) and thus transfer heat to the tubular film 35 in a dissimilar manner. In some examples, the guide member 60 may include ribs of three or more types with different effective heat transfer coefficients with respect to heat transfer to the tubular film 35. In some examples, the guide member 60 or the like may include ribs in which the heat transfer coefficient difference between adjacent ribs changes stepwise along the y direction.

The guide member 60 according to certain embodiments includes the first ribs 65 as first contact portions and at least one of the second ribs 66, 67, 68, 69 as a second contact portion. On the other hand, a guide member 60 or the like may instead have a first contact surface as the first contact portion and a second contact surface as the second contact portion. For example, the first contact surface and the second contact surface may be partitioned from one another by a groove or the like.

The image forming device is one example of an image processing device, and the fixing device 30 is one example of a heating device. In other examples, the image processing device 1 may be a decoloring device, and the fixing device 30 may be utilized as a heating device that functions as a decoloring unit. A decoloring device performs a process of decoloring (erasing) an image formed on a sheet in a decoloring or decolorable toner that changes color in response to heat or the like. The decoloring unit heats and decolors a decoloring toner image that has been formed on a sheet passed through a nip N or the like.

According to one or more embodiments described above, the guide member 60 includes the second ribs (66, 67, 68, or 69) for which the effective heat transfer to the tubular film 35 is less than the effective heat transfer of the first ribs 65 to the tubular film 35. Accordingly, unevenness in the printed image can be reduced and print quality can be improved.

While certain embodiments have been described, these embodiments have been presented by way of example only, and are not intended to limit the scope of invention. These embodiments may be embodied in a variety of other forms; various omissions, substitutions, and changes may be made without departing from the spirit of the invention. The accompanying claims and these equivalents are intended to cover such forms or modifications as would fall within the scope and spirit of the disclosure.

What is claimed is:

1. A fixing device, comprising:

a tubular body;

a pressure roller contacting an outer surface of the tubular body, a central portion of the pressure roller along an axial direction of the pressure roller has a diameter that is less than a diameter of an end portion of the pressure in the axial direction of the pressure roller;

a heater unit contacting an inner surface of the tubular body at a position opposite the pressure roller along a first radial direction of the tubular body;

a frame configured to support the heater unit inside the tubular body, the heater unit being on a first side of the frame; and a guide member contacting the frame on a second side of the frame, the second side being opposite the first side along the first radial direction of the tubular body, the guide member having a plurality of contact portions which are spaced from each other in a longitudinal direction of the guide member that parallels the axial direction of the pressure roller, the contact portions being configured to contact the inner surface of the tubular body, wherein a first contact portion of the plurality of contact portions is located in an end portion of the guide member in the longitudinal direction, a second contact portion of the plurality of contact portions is located in a central portion of the guide member in the longitudinal direction, and a distance in the first radial direction between a tip of the first contact portion and the pressure roller contacting the outer surface of the tubular body is less than a distance in the first radial direction between a tip of the second contact portion and the pressure roller contacting the outer surface of the tubular body.

2. The fixing device according to claim 1, wherein the guide member is bent away from the pressure roller such that the central portion of the guide member is convex relative to the end portion.

3. The fixing device according to claim 1, wherein the plurality of contact portions are ribs that project outwardly in a radial direction of the tubular body, and extend along a circumferential direction of the tubular body.

4. The fixing device according to claim 3, wherein the ribs all have the same shape.

5. The fixing device according to claim 3, wherein a length of the second contact portion in the circumferential direction is less than a length of the first contact portion in the circumferential direction.

6. The fixing device according to claim 3, wherein a width of the second contact portion in the longitudinal direction is less than a width of the first contact portion in the longitudinal direction.

7. The fixing device according to claim 3, wherein a height of the second contact portion in the radial direction is less than a height of the first contact portion in the radial direction.

8. The fixing device according to claim 1, wherein the second contact portion is formed of a material with a lower thermal conductivity than a material of which the first contact portion is formed.

9. The fixing device according to claim 1, wherein contact portions in the end portion of the guide member have an effective heat transfer coefficient with respect to the tubular body that is greater than an effective heat transfer coefficient of contact portions with respect to the tubular body in the central portion of the guide member.

10. An image forming apparatus, comprising:

a sheet conveyor configured to convey a sheet;

a printing unit configured to form a toner image on the sheet conveyed by the sheet conveyor; and a fixing device configured to fix the toner image to the sheet with heat and pressure, the fixing device including:

a tubular body;

a pressure roller contacting an outer surface of the tubular body, a central portion of the pressure roller along an axial direction of the pressure roller has a diameter that is less than a diameter of an end portion of the pressure in the axial direction of the pressure roller;

a heater unit contacting an inner surface of the tubular body at a position opposite the pressure roller along a first radial direction of the tubular body;

a frame configured to support the heater unit inside the tubular body, the heater unit being on a first side of the frame; and a guide member contacting the frame on a second side of the frame, the second side being opposite the first side along the first radial direction of the tubular body, the guide member having a plurality of contact portions which are spaced from each other in a longitudinal direction of the guide member that parallels the axial direction of the pressure roller, the contact portions being configured to contact the inner surface of the tubular body, wherein a first contact portion of the plurality of contact portions is located in an end portion of the guide member in the longitudinal direction, a second contact portion of the plurality of contact portions is located in a central portion of the guide member in the longitudinal direction, and a distance in the first radial direction between a tip of the first contact portion and the pressure roller contacting the outer surface of the tubular body is less than a distance in the first radial direction between a tip of the second contact portion and the pressure roller contacting the outer surface of the tubular body.

11. The image forming apparatus according to claim 10, wherein the guide member is bent away from the pressure roller such that the central portion of the guide member is convex relative to the end portion.

12. The image forming apparatus according to claim 10, wherein the plurality of contact portions are ribs that project outwardly in a radial direction of the tubular body, and extend along a circumferential direction of the tubular body.

13. The image forming apparatus according to claim 12, wherein the ribs all have the same shape.

14. The image forming apparatus according to claim 12, wherein a length of the second contact portion in the circumferential direction is less than a length of the first contact portion in the circumferential direction.

15. The image forming apparatus according to claim 12, wherein a height of the second contact portion in the radial direction is less than a height of the first contact portion in the radial direction.

16. The image forming apparatus according to claim 10, wherein the second contact portion is formed of a material with a lower thermal conductivity than a material of which the first contact portion is formed.

17. The image forming apparatus according to claim 10, wherein contact portions in the end portion of the guide member have an effective heat transfer coefficient with respect to the tubular body that is greater than an effective heat transfer coefficient of contact portions with respect to the tubular body in the central portion of the guide member.

18. An image forming device, comprising:

a sheet conveyor configured to convey a sheet;

a printing unit configured to form a toner image on the sheet conveyed by the sheet conveyor; and a fixing device configured to fix the toner image to the sheet with heat and pressure, the fixing device including:

a tubular body;

a pressure roller contacting an outer surface of the tubular body, a central portion of the pressure roller along an axial direction of the pressure roller has a diameter that is less than a diameter of an end portion of the pressure in the axial direction of the pressure roller;

a heater unit contacting an inner surface of the tubular body;

a frame configured to support the heater unit inside the tubular body; and a guide member contacting the frame on a second side of the frame, the second side being opposite the first side along the first radial direction of the tubular body, the guide member having a plurality of ribs which are spaced from each other in a longitudinal direction of the guide member that parallels the axial direction of the pressure roller, the ribs being configured to contact the inner surface of the tubular body, wherein a first rib of the plurality of ribs is located in an end portion of the guide member in the longitudinal direction, a second rib of the plurality of ribs is located in a central portion of the guide member in the longitudinal direction, and a distance in the first radial direction between a tip of the first rib and the pressure roller contacting the outer surface of the tubular body is less than a distance in the first radial direction between a tip of the second rib and the pressure roller contacting the outer surface of the tubular body.

19. The image forming apparatus according to claim 18, wherein the guide member is bent away from the pressure roller such that the central portion of the guide member is convex relative to the end portion.

20. The image forming apparatus according to claim 18, wherein a length of the second rib in the circumferential direction is less than a length of the first rib in the circumferential direction.

* * * * *